No. 781,704. PATENTED FEB. 7, 1905.
A. C. WIRTH.
LAWN EDGE MOWER OR CUTTER.
APPLICATION FILED APR. 19, 1902.

Witnesses.
Inventor.
Andrew C. Wirth
By Benedict & Morsell
Attorneys.

No. 781,704. Patented February 7, 1905.

UNITED STATES PATENT OFFICE.

ANDREW C. WIRTH, OF MILWAUKEE, WISCONSIN.

LAWN-EDGE MOWER OR CUTTER.

SPECIFICATION forming part of Letters Patent No. 781,704, dated February 7, 1905.

Application filed April 19, 1902. Serial No. 103,667.

*To all whom it may concern:*

Be it known that I, ANDREW C. WIRTH, residing at Milwaukee, in the county of Milwaukee and State of Wisconsin, have invented a new and useful Improvement in Lawn-Edge Mowers or Cutters, of which the following is a description, reference being had to the accompanying drawings, which are a part of this specification.
My invention has relation to improvements in lawn-edge mowers or cutters intended principally for cutting the edges of lawns which are inaccessible to the ordinary form of lawnmowers.
The primary object of the invention is to provide an improved mechanism capable of efficiently cutting the grass at the extreme edges of a lawn or close up to a house, fence, post, or the like, the device combining simplicity in construction and compactness in arrangement.

With the above primary object and other incidental objects in view the invention consists of the devices and parts or their equivalents, as hereinafter set forth.

Figure 1:
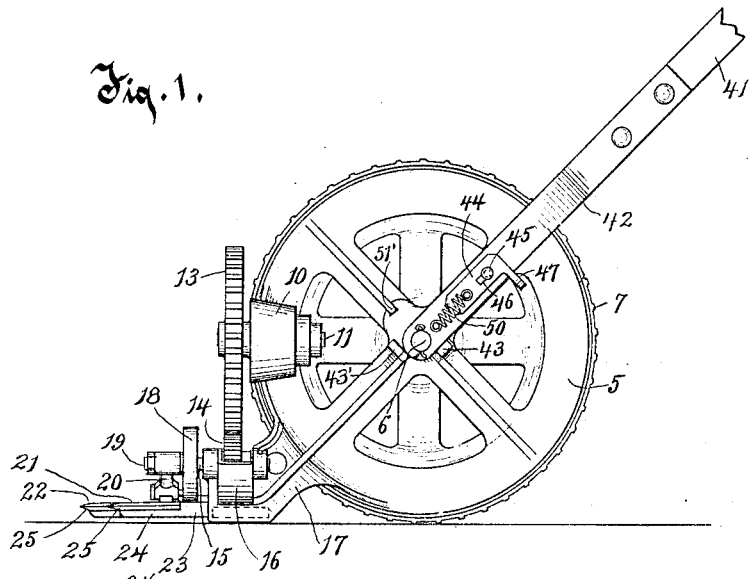
Figure 2:
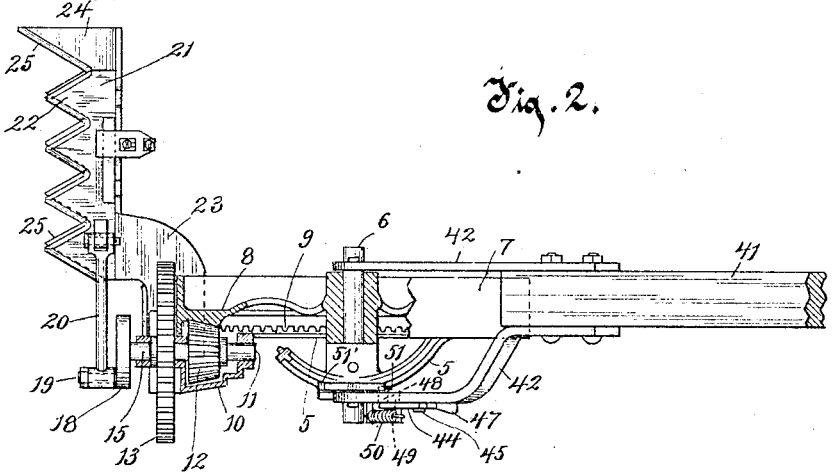

In the accompanying drawings, Figure 1 is a side elevation of a mower or cutter of my improved construction, the outer end of the operating-handle being broken away; and Fig. 2 is a plan view, parts broken away and in section.

Referring to the drawings, the numeral 5 indicates an open annular frame or spider, which preferably bulges or curves outwardly centrally. Fast in a central opening of this outwardly-bulged portion is a projecting axial shaft or pin 6, upon which is mounted a single ground-wheel 7, the outer surface of the periphery of said wheel being roughened or ridged in order to provide a firm grip of the wheel on the ground. Extending from the inner surface of this wheel is an annular flange 8, upon one side of which are formed a series of rigid beveled teeth 9 arranged thereon.
Outstanding from the annular frame or spider 5 is a bearing 10, preferably in the form of a box, and in the opposite ends of this bearing-box are mounted the ends of a short shaft 11, said shaft having mounted thereon within the box a beveled pinion 12. The inner side of the box is open, so that the teeth of this beveled pinion can mesh with the beveled teeth 9. By the provision of the box 10 I am enabled to prevent dust from clogging the teeth of the pinion 12, and at the same time by reason of the fact that the inner side of said box is provided with an opening the pinion 12 is enabled to extend into the frame 5 and engage the annularly-arranged teeth 9, whereby the frame 5 may be closed, and hence the entrance of dust therein also prevented. The forward end of shaft 11 projects beyond the box and has mounted thereon a gear-wheel 13, said gearwheel meshing with a pinion 14. The ends of the shaft 15 of this pinion are journaled in bearings formed in an open-topped box 16, said box being formed at the extremity of a forwardly-extending arm 17 from the lower portion of the frame or spider 5. The top of this box is open for the purpose of permitting the teeth of the gear-wheel 13 to mesh with the teeth of the pinion 14. The forward end of shaft 15 is extended outwardly beyond its bearing and has mounted thereon a disk 18, provided with a projecting crank-pin 19, to which is pivotally connected one end of a link 20, the opposite end of said link being pivotally connected to a lug projecting upwardly from a movable cutter-bar 21, said cutter-bar having projecting forwardly therefrom a series of cutting-blades 22.

Projecting laterally from the lower portion of the arm 17 is another arm, 23, from which extends in a straight line laterally a lower fixed cutter-bar 24, having the forwardly-projecting teeth 25. The movable cutter-bar is supported and guided on top of the stationary cutter-bar in any suitable manner.

The handle of the mower is indicated by the numeral 41. From the inner end of this handle extends straps 42 42, which are loosely mounted on the shaft 6. Projecting outwardly from the frame or spider are lugs 43 43'. The handle is shown as resting against the lug 43, and in this position the said handle is adjusted for pushing the mower forwardly. When the operator desires to pull the machine toward him and at the same time have the movable cutter-bar reciprocate, the handle is merely thrown over from the lug 43 until it contacts with and rests against the lug 43'.

In the operation of the machine when the cutter is moved forwardly the ground-wheel is caused to turn, and the internal beveled gear 9 of said wheel will cause a rotation of the beveled pinion 12, and hence a reciprocation given to the movable cutter-bar 21, through the connection afforded by the gear-wheel 13, pinion 14, crank-disk 18, and link 20.

It is obvious that as the cutting mechanism projects laterally and in advance of the ground-wheel the machine is capable of reaching to the edges of lawns and is thereby adapted to cut the grass along such edges with ease and facility. The device is also capable of being run up close to a house, fence, post, and the like and effect the cutting in close proximity thereto.

It is desirable, when the handle 41 is turned so as to contact with one or the other of the lugs 43 or 43', that means should be employed for releasably locking the handle in either of said positions. To provide for this, I mount slidingly on one of the straps 42 a catch 44, said catch being preferably slidingly secured to the strap 42 by a pin 45, extending through an elongated slot 46 in the catch and entering the strap 42. The outer end of the catch is bent at an angle to form a projection 47, which provides a convenient means for operating said catch either with the finger or with the toe of the shoe. The inner end of the catch is provided with an inwardly-extending dog or detent 48, which projects through an elongated slot 49 in the strap 42. One end of a coiled spring 50 is secured to the catch, and the opposite end of said spring is secured to the strap 42, the said spring tending normally to hold the catch in the position illustrated in the drawings. The dog or detent is adapted to engage one or the other of the notches 51 or 51', depending upon the adjustment of the handle. In the operation of this part of the device, if the handle is in the position shown in Figs. 1 and 2 and it is desired to turn said handle over so as to rest against the lug 43', all that is necessary to be done is to pull outwardly on the projection 47 either with the hand or with the toe of the shoe. This will release the dog or detent 48 from engagement with the notch 51 and permit the handle to be swung over so as to rest against the lug 43', and the moment it contacts with said lug the spring 50 will slide the catch inwardly and cause the dog or detent 48 thereof to engage with the notch 51', and hence lock the handle in this position.

What I claim as my invention is—

1. In a lawn-edge cutter, a single ground-wheel, an axle therefor, a forked handle connected to the axle, annularly-arranged teeth on the ground-wheel, a frame mounted on the axle and protecting the teeth of the ground-wheel, a forwardly-extending arm on the frame bearing on the ground in advance of the ground-wheel, a fixed cutter-bar carried by a lateral extension of said arm and extending laterally of the machine and in advance of the entire ground-wheel, a gear-casing on the frame, a horizontal shaft mounted therein with a forwardly-projecting end, a pinion on said shaft within the casing meshing with the teeth of the ground-wheel, a gear-wheel on the forward projecting end of the shaft, an open box on the arm, a pinion mounted therein meshing with the gear-wheel, a crank-disk carried by the pinion driven from the gear-wheel, a movable cutter-bar coöperating with the fixed cutter-bar, and a link connecting said movable cutter-bar with the crank-disk.

2. In a lawn-edge cutter, a single ground-wheel, an axle therefor, a forked handle connected to the axle, annularly-arranged teeth on the ground-wheel, a frame mounted on the axle and protecting the teeth of the ground-wheel, a forwardly-extending arm on the frame bearing on the ground in advance of the ground-wheel, a fixed cutter-bar carried by said arm and extending laterally of the machine and in advance of the ground-wheel, a horizontal shaft journaled in the frame with a forwardly-projecting end, a pinion on said shaft meshing with the teeth of the ground-wheel, a gear-wheel on the forwardly-projecting end of the shaft, a pinion journaled in the frame and meshing with the gear-wheel, a crank-disk carried by said pinion, a movable cutter-bar coöperating with the fixed cutter-bar, and a link connecting said movable cutter-bar with the crank-disk.

In testimony whereof I affix my signature in presence of two witnesses.

ANDREW C. WIRTH.

Witnesses:
A. L. MORSELL,
ANNA V. FAUST.